UNITED STATES PATENT OFFICE.

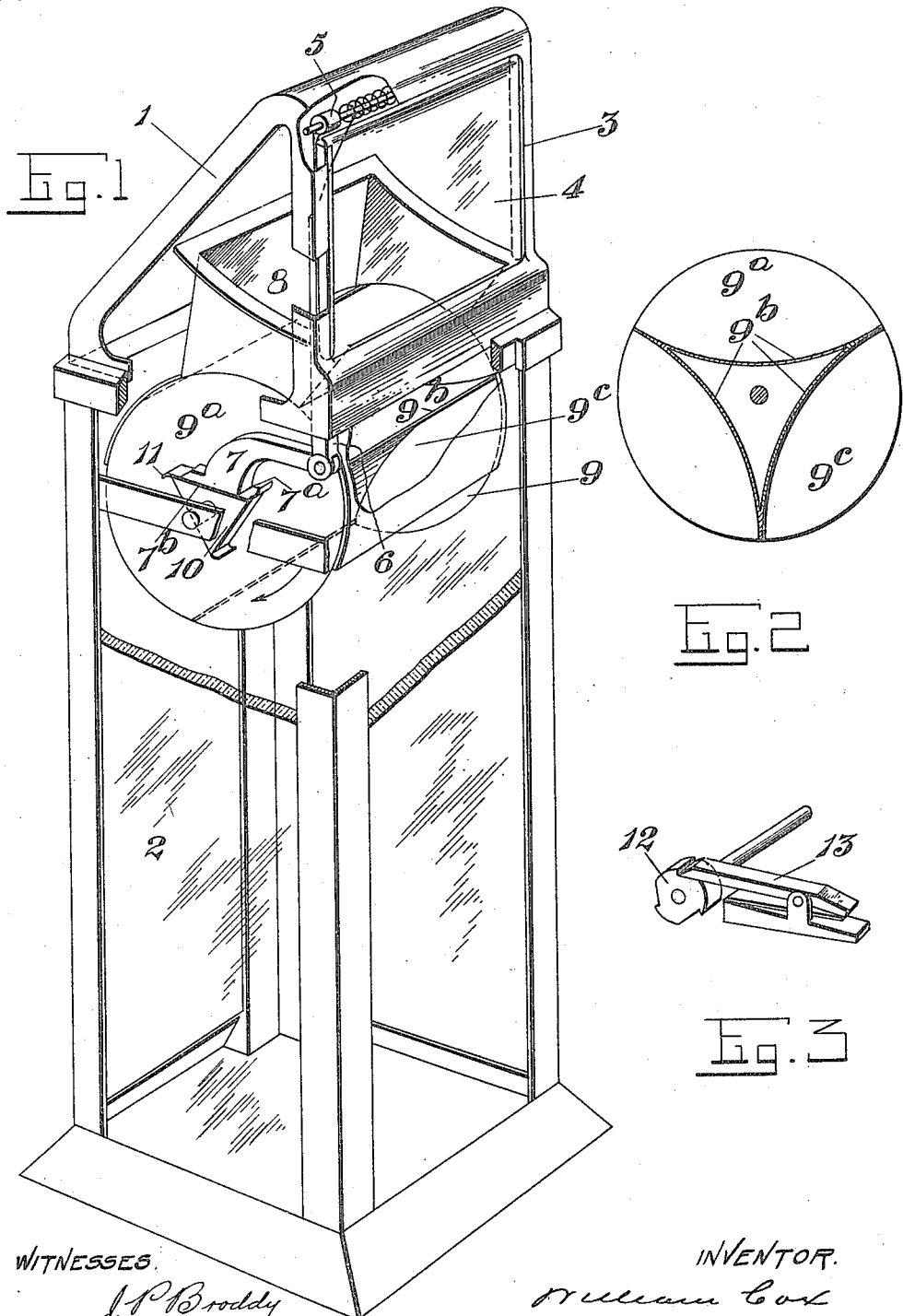

WILLIAM COX, OF TORONTO, ONTARIO, CANADA.

FARE-BOX.

1,135,260.   Specification of Letters Patent.   Patented Apr. 13, 1915.

Application filed June 1, 1914. Serial No. 842,289.

*To all whom it may concern:*

Be it known that I, WILLIAM COX, of the city of Toronto, in the county of York and Province of Ontario, Dominion of Canada, have invented certain new and useful Improvements in Fare-Boxes; and I hereby declare that the following is a full, clear, and exact description of the same.

My invention relates to a fare box in which the examining chamber is provided with an intermittently rotating trap, having one or more compartments successively brought, during the intermittent rotation of the trap, into position below the fare receiving entrance normally closed by a movable cover which must be displaced from its normal position before the fare can be inserted, and which automatically returns to its normal position thereafter, said cover during its return movement operating to cause the rotation or partial rotation of the trap whereby the admitted fare will be deposited within the examining chamber and prevented thereafter from being extracted therefrom, and the invention consists of essentially providing the trap with a peculiarly constructed ratchet member and of providing the cover with a pawl which engages with the ratchet member to cause the intermittent rotation of the trap, during the movement of the cover and to arrest the rotation of the trap when the movement of the cover ceases.

For an understanding of my invention, reference is to be had to the following description and to the accompanying drawings, in which:

Figure 1 is a broken perspective view of the fare box showing the construction and arrangement of the parts; Fig. 2 is a vertical section through the trap; and Fig. 3 is a detail view of the detent which prevents the reverse rotation of the trap.

Like characters of reference refer to like parts throughout the specification and drawings.

In the top 1 of the examining chamber 2 is a fare receiving entrance 3 having a cover 4 provided with a spring tensioned hinge 5 at the top of the entrance which permits of the cover being opened and automatically closes it, and depending from the cover 4 is an arm 6 to which is pivoted a pawl 7. Within the top 1, below the entrance 3, is a fare chute 8 through which the fares descend to the examining chamber 2. Journaled in the examining chamber 2 below the chute 8 is an intermittently rotating trap 9 consisting of two side plates $9^a$ and a set of curved partitions $9^b$, secured to the inner faces of the side plates $9^a$ and forming therewith a number of compartments $9^c$ which are successively brought into position below the inner end of the fare chute 8. Fixed to the outer face of one of the side plates $9^a$ is a multi-laterally sided ratchet member 10 each side of which is provided with a projecting lip 11 to be engaged by the pawl 7, and fixed to the outer face of the other side plate $9^a$ is a ratchet drum 12 engaged by a spring tensioned detent dog 13 pivoted withing the examining chamber 2.

As shown in Fig. 2 of the drawings, the trap 9 has three compartments $9^c$ formed by the three partitions $9^b$ and for that reason the ratchet member 10 is of a substantially triangular shape, as shown in Fig. 1, the sides of the ratchet member corresponding with the arrangement of the partitions $9^b$ so that each partial rotation of the trap will bring one of the compartments into position with the lower end of the chute. If the trap is divided into more than three compartments the number of sides of the ratchet member 10 will be increased and if the trap is divided into less than three compartments the number of sides of the ratchet member 10 will be decreased. Thus it will be understood that the number of sides of the ratchet will correspond with the number of compartments of the trap.

The inward movement of the cover 4 moves the pawl 7 toward the back of the examining chamber 2 until the heel $7^a$ of the pawl is clear of the lip 11 at the rear of the uppermost side of the ratchet. The pawl then drops downwardly by gravity in rear of the lip 11 so that the heel $7^a$ will engage it during the closing movement of the cover. When the cover is closing the pawl 7 moves toward the front of the fare box and the heel $7^a$ thus engages the lip 11 and causes a partial forward rotation of the trap, the lip 11 moving forward with the pawl and turning the rear side of the ratchet uppermost, until it comes into contact with the foot $7^b$ of the pawl, which then arrests the further rotation of the trap in a forward direction, as indicated by arrow in Fig. 1, until the cover 4 has been again moved inward for the admission of another fare, the reverse rotation of the trap being prevented by the ratchet drum 12 and the detent dog 13.

In the use of the fare box the cover 4 is normally closed and to introduce a fare into the examining chamber the cover is pressed inward until the entrance to the fare chute 8 is exposed. During the inward movement of the cover, the foot $7^b$ of the pawl slides along the uppermost side of the ratchet member 10 until the heel of the pawl clears the lip 11, the trap during such movement being held stationary by the ratchet drum 12 and detent dog 13 to prevent its reverse movement. When the heel of the pawl clears the lip 11, the pawl drops in rear of the ratchet member 10, the cover 4 then being opened to its full extent. When the fare has been deposited, the cover under the influence of its spring tensioned hinge 5 returns to its normal position and the heel $7^a$ of the pawl 7 engaging the lip 11 at the rear of the uppermost side draws the lip in a forward direction to the front of the ratchet member, the trap during this movement making a partial revolution to move the compartment, which was uppermost during the opening movement of the cover, from beneath the lower end of the chute so that the fare deposited through the chute into that compartment will be delivered into the examining chamber 2.

By means of this construction, I am able to intermittently rotate the trap a partial revolution whenever a fare has been inserted through the fare receiving entrance, immediately deposit that fare in the examining chamber and effectively shut off all communication between the examining chamber and fare receiving entrance so that the fare cannot be extracted therefrom.

Having thus fully described the nature of my invention, what I claim as new and desire to secure by Letters Patent is:

In a fare box comprising an examining chamber having a fare-receiving entrance, the combination of an intermittently-rotating trap within the examining chamber, a multi-laterally-sided ratchet member for the trap with a projecting lip for each side, a cover for the fare-receiving entrance displaceable for the admission of the fare, and a pawl connected with the cover having a reciprocatingly sliding engagement with each side of the ratchet member, the pawl as it moves in one direction engaging the projecting lip and causing the intermittent rotation of the trap during the closing movement of the cover, and then engaging the adjacent side of the ratchet member to arrest the forward rotation of the trap until the cover is again moved to an open position.

Toronto, May 20th, 1914.

WILLIAM COX.

Witnesses:
CHAS. H. RICHES,
PAR MONTIGNY KENNEDY.

Copies of this patent may be obtained for five cents each, by addressing the "Commissioner of Patents, Washington, D. C."